Nov. 30, 1926. 1,608,810

G. E. RASMUSSEN ET AL

PAN OILING MACHINE

Filed Dec. 8, 1924 3 Sheets-Sheet 1

INVENTORS
GUST E. RASMUSSEN
GILBERT W. SKINNER
PEARL M. COOK
BY
Richard J. Cook
ATTORNEY

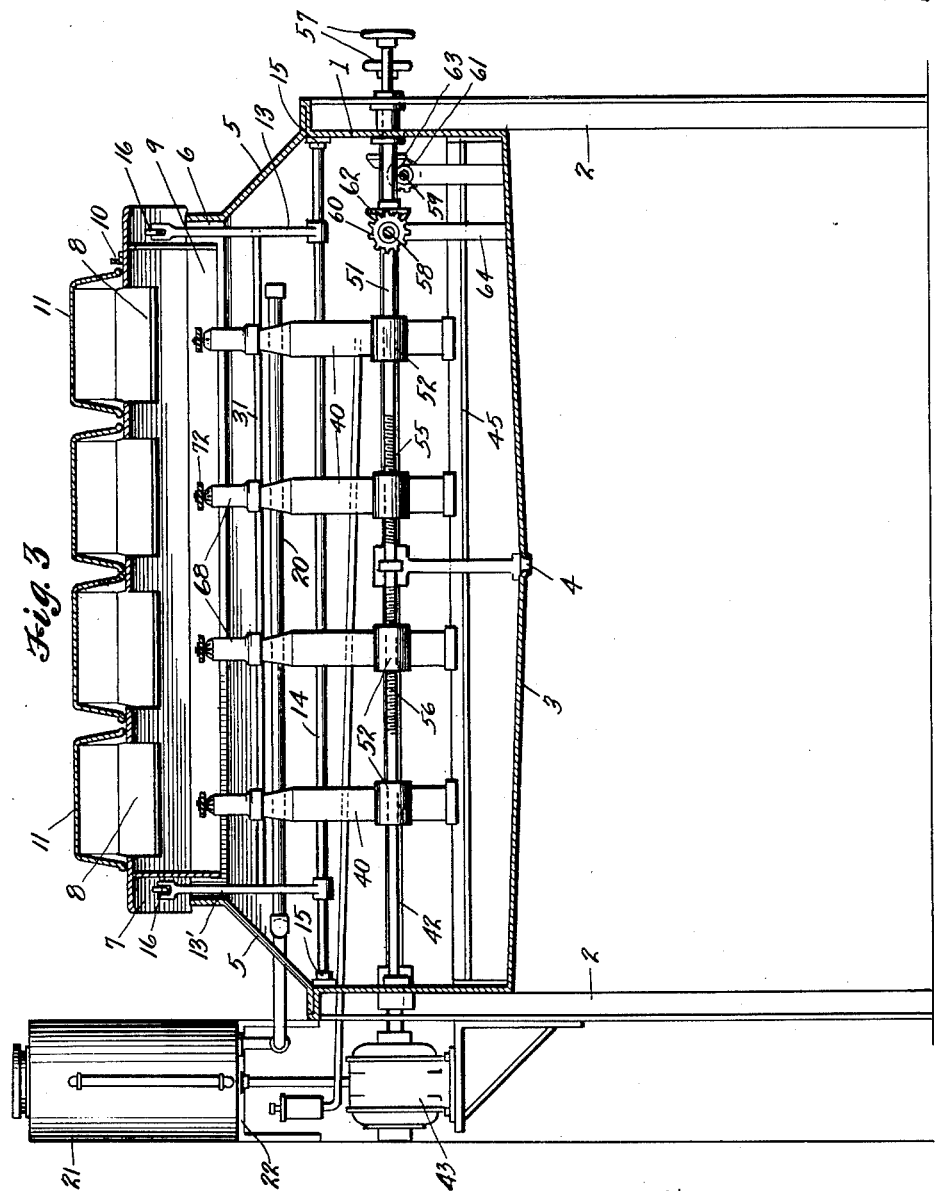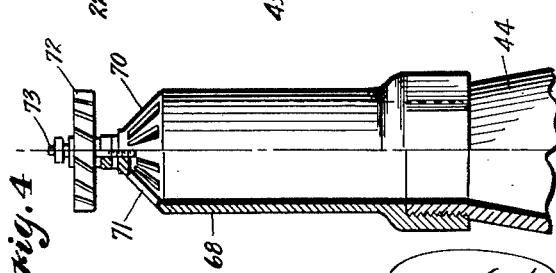

Nov. 30, 1926.
G. E. RASMUSSEN ET AL
1,608,810
PAN OILING MACHINE
Filed Dec. 8, 1924     3 Sheets-Sheet 3
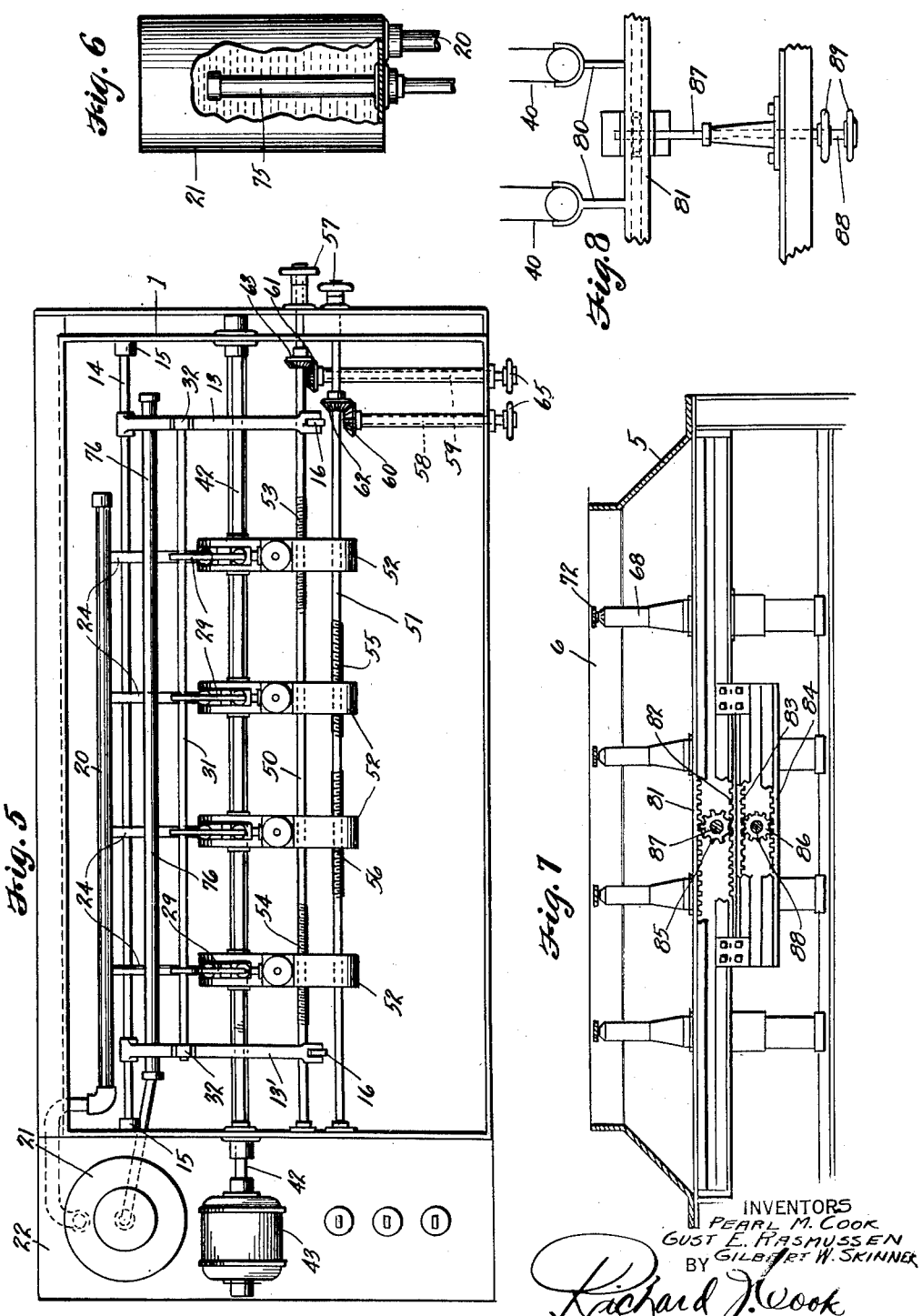
INVENTORS
PEARL M. COOK
GUST E. RASMUSSEN
GILBERT W. SKINNER
BY
Richard J. Cook
ATTORNEY Patented Nov. 30, 1926.

1,608,810

UNITED STATES PATENT OFFICE.

GUST E. RASMUSSEN, GILBERT W. SKINNER, AND PEARL M. COOK, OF SEATTLE, WASHINGTON.

PAN-OILING MACHINE.

Application filed December 8, 1924. Serial No. 754,529.

This invention relates to improvements in pan oiling machines and more particularly to devices of that character for use in bakeries, or like places, for oiling or greasing the pans in which baking is done; it being the principal object of the invention to provide a machine for automatically applying a film, or coating of oil to the pans, and wherein air blowers are used for atomizing and applying the oil.

Another object of the invention is to provide a machine of the above character embodying valve mechanisms of novel construction for measuring the quantity of oil delivered to each pan and which are operated automatically by the application of a pan or set of pans to the machine.

Another object of the invention is to provide means for adjusting the spacing apart of the several oiling devices in order that they will conform to the spacing of pans of different size and width.

A still further object is to provide atomizers of novel construction in connection with each of the blowers and measuring valves, whereby the interior of the pans may be uniformly covered with a film of oil.

Other objects of the invention reside in the various details of construction and combination of parts embodied in the invention and in their mode of operation.

In accomplishing these and other objects of the invention, we have provided the improved details of construction, the preferred forms of which are illustrated in the accompanying drawings, wherein—

Figure 3 is a longitudinal, sectional view of the machine, taken substantially on the line 3—3 in Figure 1.

Figure 4 is an enlarged detail view of one of the oil atomizers used.

Figure 5 is a plan view of the machine with the top section removed to better illustrate the disposition of the atomizers and parts associated therewith.

Figure 6 is an elevation of the oil container, with a part broken away to show the heating element therein.

Figure 7 is a detail view illustrating an alternative means for adjusting the atomizers to different positions.

Figure 8 is a plan view of a part of the latter adjusting mechanism.

Figures 1, 2:
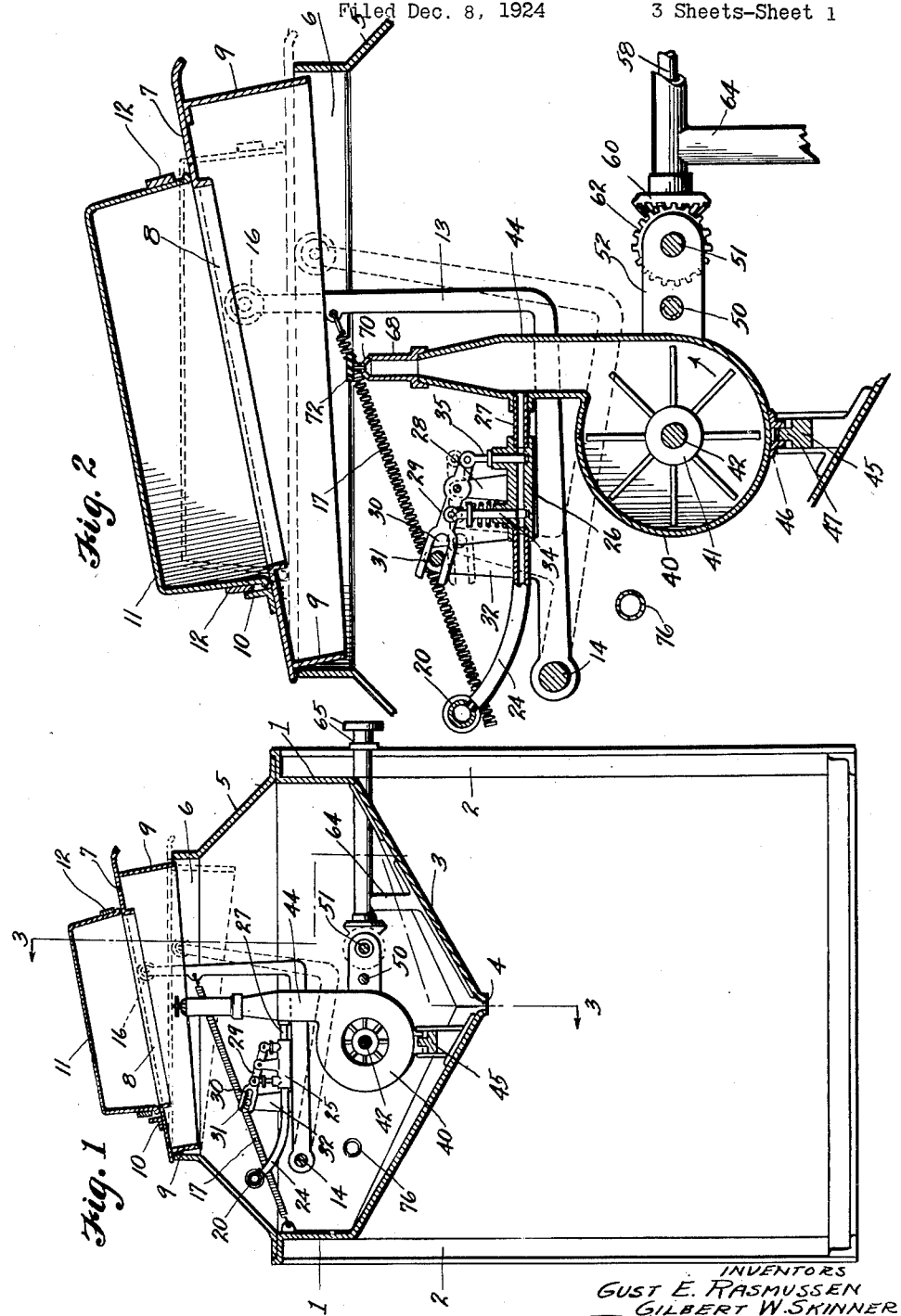
Figure 1 is a transverse, sectional view of a pan oiling machine embodied by the present invention.
Figure 2 is an enlarged detail view in vertical section of one of the oiling units, showing the construction of the measuring valve and atomizer, and illustrating the operation of the valve by depression of the pan die.

Referring more in detail to the several views of the drawings—

1 designates what may be a rectangular, box-like housing, preferably made of sheet metal and supported at a suitable working height by means of angle iron legs 2 at its four corners. The base wall 3 of the housing is inclined to a central discharge opening 4 beneath which a suitable vessel may be placed to catch any waste oil.

The upper portion of the housing is equipped with a cover section 5 having a central opening 6 within which a pan supporting die 7 may be removably fitted; the die consisting of a flat, sheet metal plate provided with a plurality of openings 8 and having depending flanges 9 extended from its under side which fit within the opening 6 to retain the die properly in place and which prevents the atomized oil from being thrown or blown outside the housing when the die is in raised position. Along the opposite side and back edges of the plate are upwardly extending flanges 10 whereby the bread pans 11, applied to the die in inverted position, will be retained properly in registration with the die openings 8 when oil is being applied thereto.

To facilitate the handling of the pans 11, they are fastened together in sets, as shown in Figure 3 by means of bars 12 secured to their ends and for pans of different width, different dies are provided. The present illustrations show a die suitable for four pans and there are four oiling devices, which are adjustable to different spaced relations so as to deliver the oil through the openings of different dies used.

The die plate is normally supported in an upwardly inclined position with its rearward edge resting along the rearward edge of the opening 6 in the top 5 so as to be pivotally movable. It is yieldingly retained in this position, as shown best in Figure 2, by means of two angular levers 13—13' that have ends fixed to a cross shaft 14 rotatably supported at its ends in bearings 15 fixed to the opposite end walls of the housing 1.

At their upper ends the levers carry rollers 16 that engage with the under side of the die plate 7. Springs 17 are attached to the levers and to the back wall of the housing to normally support the die in raised position as shown. The parts are so arranged that when the die is pressed downwardly, the levers 13—13' will swing downwardly and by such movement will actuate valve mechanisms, presently described, to admit oil to the blowers and atomizers for delivery to the pans.

Extending horizontally within the housing, near the back wall, is a pipe 20 having one end extending from an end of the housing and connected with the lower end of an oil container 21 supported on a shelf 22 above the level of pipe 20. From the pipe 20, at spaced intervals, four flexible tubes 24 are extended which connect respectively with four valve sets 25 by means of which oil is delivered in measured quantities to the pans when oiling is done. Each of these valve mechanisms consists of a tubular housing 26 supported horizontally and connected at one end with a tube 24 and at its opposite end with a tube 27 which in turn is supported from and opens into the discharge tube of one of the four blowers used for delivering the oil to the pans and which are later described in detail.

The flexible pipe connection between the supply pipe 20 and the blowers permits adjustment of the latter without destroying the connection.

Supported pivotally upon the valve housings 26 between standards 28 thereon, are levers 29, each provided at one end with a longitudinal slot, or recess, 30 wherein a cross rod 31, supported at its ends from standards 32 on the levers 13—13', is slidably contained. When the levers 13—13' are actuated downwardly by the depression of the die plates 5, this cross rod 31 moves accordingly and effects pivotal movement of all of the levers 29.

Attached pivotally to each lever 29, at opposite sides of their pivot points, are slide valves 34 and 35 which operate in channels that cross the oil channels of the housings 26. When the die 7, levers 13—13' and valve parts are in normal position, as shown in Figure 1, the valves 34 are all withdrawn from the channels of the valve housings (see Figure 2) and valves 35 are extended so as to close the passages and prevent the flow of oil to the blowers. When the die is depressed to the position shown in dotted lines, the levers 29 are actuated to reverse the valves 34 and 35 so that valves 34 closes the oil passages and valves 35 are withdrawn thereby permitting the flow of measured quantities of oil to the blowers.

Each blower consists of a fan housing 40 wherein a fan 41 is located; the several housings being in alinement with the fans all mounted on a continuous shaft 42 that extends from one end of the housing where it is driven by means of an electric motor 43 supported on the shelf 22. Each blower housing has an upwardly directed discharge pipe 44 into which the pipes 27 of the oil measuring valves open and which, at their upper ends, are equipped with atomizers whereby the oil delivered into the pipes and discharged by the air from the fans is caused to be atomized and sprayed over the interior of the pans.

The four blowers are located directly beneath the openings 8 in the die 7 and are supported slidably, so as to permit them to be adjusted from and toward each other in accordance with the spacing of the openings in different dies, upon a horizontal bar 45 extended between the end walls of the housing, as shown in Figure 2. Each fan blower housing has a guide piece 46 fixed to its under side provided with a slot adapted to slidably receive a rib 47 formed longitudinally on the bar.

The means for adjusting the blowers is best shown in Figures 3 and 5, and consists of two horizontal shafts 50 and 51 extended in parallel relation within the housing and through lugs or blocks 52 fixed to the blower housings. The shaft 50 has right and left hand threaded connections, as at 53 and 54 (see Figure 5) with the lugs of the two outer blowers, and is slidable through the lugs of the two inner blowers, while the shaft 51 has right and left hand threaded connection as at 55—56 with the lugs of the two inner blowers and sliding connection through the lugs of the outer blowers. At their outer ends the shafts are equipped with knobs 67 whereby they may be rotated to effect the slidable adjustment of the blowers to suit the spacing of the openings of different dies.

To provide for making this adjustment from the front of the machine, we have provided the shafts 58—59 having bevel gear wheels 60—61 at their inner ends meshing, respectively, with gear wheels 62—63 on the shafts 50—51. The shafts 58—59 are rotatably mounted in supporting brackets 64 and at their outer ends have knobs 65 fixed thereto whereby they may be rotated.

Each of the atomizers consists of a tubular casing 68 fitted upon the upper end of the discharge pipe of a blower and having a conically tapered end wall 70 provided with a plurality of slots 71 through which air and oil are blown against impeller wheels 72 mounted for horizontal rotation on spindles 73 fixed centrally in these end walls. Preferably, the impeller wheels consist of a plurality of radially extended vanes turned at an angle to the direction of air delivered against them so that they will be revolved rapidly and the oil thrown thereby in a finely atomized condition against the inner surface of the pans.

It is also desired to provide electrical heating elements within the oil container and housing as designated respectively by reference numerals 75 and 76 so that the oil will be kept in proper fluid condition.

In Figures 7 and 8 we have illustrated an alternative shifting mechanism for the blowers wherein the paired blower housings are connected by arms 80 (see Figure 8,) with slidably mounted racks 81—82 and 83—84; the racks 81 and 82 being arranged to mesh with opposite sides of a gear wheel 85 and the racks 83—84 likewise mesh with a gear 86. These gears are fixed on adjusting shafts 87 and 88 that extend to the front of the housing and are there equipped with turning wheels 89. By this means the same adjustment may be made as with the mechanism previously described.

Assuming that the parts of the machine are so constructed and assembled, to use the same, a die 7 of proper size is selected and located within the opening 6 of housing cover 5 so that it is held in an upwardly inclined position by the ends of levers 13—13'. A set of pans 11 is then placed on the die in inverted position, as shown in Figures 2 and 3, and pressure is applied downwardly thereon so as to move the die to a horizontal position, causing levers 13—13' to be swung downwardly and the measuring valves, under control of cross rod 31 and levers 29, to be opened to admit specified amounts of oil into the discharge pipes of the blowers. The blower fans being in operation within the several blower housings, the oil is caught up and delivered through the discharge pipes and atomizers into the pans. When pressure is removed from the pans, the die will be lifted by the pull of springs 17, the valves closed and all parts returned to normal position. No oil is discharged by the blowers after the valves close and the pans may be removed without danger of oil being thrown through the die openings.

Having thus described our invention, what we claim as new therein and desire to secure by Letters-Patent, is:

1. In a pan oiling machine, the combination with means for supporting a pan in position for oiling and a source of oil supply of an oil applying device comprising an air blower having a discharge pipe directed into the pan, a valve mechanism connected with the oil supply and blower discharge pipe and means for actuating the valve mechanism to admit predetermined quantities of oil into the latter.

2. In a pan oiling machine, the combination with means for supporting a pan in position for oiling and a source of oil supply, of an oil applying device comprising an air blower having a discharge pipe directed into the pan, an atomizing device at the end of said discharge pipe, a valve mechanism connected with the oil supply and opening into the said blower discharge pipe and means operable by the application of a pan to the supporting means for actuating the valve mechanism to deliver a predetermined quantity of oil into the blower for the purpose set forth.

3. In a pan oiling machine, an oiling device comprising in combination with a source of oil supply, a blower housing having an air discharge pipe directed into the pan to be oiled, a continuously operating blower fan within the housing, an oil delivery valve connected with the source of oil and operable to discharge measured quantities of oil into the blower discharge pipe and an oil atomizing device at the end of said discharge pipe operable by the air current.

4. In a pan oiling machine, an oiling device comprising in combination with a source of oil supply, a blower housing having an air discharge pipe directed into the pan to be oiled, a blower fan operable within the housing, an oil delivery valve connected with the source of oil and operable to discharge oil into the blower discharge pipe, said blower discharge pipe having a conically tapered end wall provided with radial slots therein and an impeller wheel fixed rotatably to the end of said pipe for atomizing oil delivered by the air through said slots.

5. In a pan oiling machine, the combination with a source of oil supply and means for delivering air under pressure, of an air discharge tube adapted to receive oil thereinto and having a conically tapered end wall provided with a plurality of radial slots, through which air and oil is discharged, a spindle fixed in said end wall and a wheel rotatable on said spindle having a plurality of impeller blades against which the air impinges to rotate the wheel and by means of which the oil delivered by the air is atomized and delivered into the pans.

6. In a pan oiling machine, the combination with means for supporting different sets of pans in position for oiling, a source of oil supply and a series of oil applying devices connected with said oil supply, of manually operable means for adjusting the spacing of the said oil applying devices to conform to the spacing of pans of different sets.

7. In a pan oiling machine, the combination with a movable pan support on which different sets of pans may be positioned for oiling and an oil supply pipe of a series of oil applying devices connected with the supply pipe, valve mechanism operable by movement of the pan support to deliver oil into the applying devices and means for adjusting the spacing of the applying devices to conform to the spacing of pans of different sets.

8. In a pan oiling machine, the combination with means for supporting different sets of pans in position for oiling, and a source of oil supply of oil applying devices connected with said oil supply and operable to deliver oil into said pans and an adjusting shaft having threaded connection with said devices and operable, by rotation, to adjust the spacing of said devices to conform to the spacing of the pans of the different sets.

9. In a pan oiling machine, the combination with means for supporting different sets of pans in position for oiling, an oil supply pipe and a series of movably supported oil applying devices connected to receive oil from the supply pipe, of an adjusting means for said oil applying devices comprising shafts having right and left hand threaded connections with paired oiling devices whereby rotation of the shafts in opposite directions effects farther or closer spacing of the said devices.

10. In a pan oiling machine, the combination with means for supporting sets of pans in position to be oiled, and an oil supply pipe of a series of blower housings arranged in alinement and having discharge pipes directed into said pans, a driven shaft, a series of blower fans in said housings and having driving connections with the shaft, a valve mechanism supported by each housing and opening into the discharge pipe, a flexible tube connecting each valve mechanism with the oil supply pipe, means operable to actuate the valve mechanisms to deliver oil into the blowers for delivery to the pans and means for adjusting the blowers to conform to the spacing of different sets of pans.

11. In a pan oiling machine, the combination with a movably mounted support on which pans may be placed for oiling, a source of oil supply and an oil applying device of a measuring valve comprising a channeled housing connected at its ends respectively with the source of oil and said applying device, inner and outer slide valves operable in said housing across the channel and means operatively connected with the said slide valves and pan support whereby certain movement of the latter, actuates the slides to deliver a measured quantity of oil into the applying device.

12. In a pan oiling machine, the combination with a movably mounted support on which pans may be placed for oiling, a source of oil supply and an oil applying device of a measuring valve comprising a channeled housing connected at its ends, respectively with the source of oil and said applying device, inner and outer slide valves operable in said housing across the channel, a pivotally supported lever connected with said slide valves, yieldable means for normally retaining the outer slide valves in open position and the inner one in closed position and means operable by depression of the pan support to move the lever pivotally to reverse the position of the slide valves.

13. In a pan oiling machine, a pivotaly mounted pan supporting die provided with openings therein over which pans may be placed for oiling, a pair of pivotally mounted lever arms in supporting engagement with said pan support, springs attached to said lever arms whereby the said pan support is yieldably retained against downward movement, a cross rod connecting said lever arms, an oil supply pipe, a series of oil applying devices, and a measuring valve for each device comprising a valve housing connected with the oil supply pipe and to the oil applying device, a pair of slide valves in the housing for controlling flow therethrough, a lever pivotally mounted on the housing connected with said slide valves and with the said cross rod whereby depression of the pan support actuates the lever to move said slide valves to admit a measured quantity of oil into the oil applying device.

14. A pan oiling machine comprising a housing having a top opening, a die pivotally mounted in said opening on which pans may be placed for oiling, a pair of lever arms pivotally mounted within the housing and having their ends in supporting engagement with opposite ends of the die, a cross rod connecting the said lever arms, springs attached to said lever arms for yieldingly supporting the die against downward movement, an oil supply pipe, a plurality of oil applying devices, an oil measuring valve for each of said devices each having a flexible connection with said oil supply pipe, and a slidable connection with the said cross rod and operable thereby upon downward movement of said die to deliver measured quantities of oil into the applying devices, and means operable from outside the housing for adjusting the spacing of the applying device.

Signed at Seattle, King County, Washington, this 12th day of September, 1924.

GUST E. RASMUSSEN.
GILBERT W. SKINNER.
PEARL M. COOK.